(12) United States Patent
Beilharz et al.

(10) Patent No.: US 12,481,271 B2
(45) Date of Patent: Nov. 25, 2025

(54) METHOD AND SYSTEM FOR ADJUSTING INPUT VALUES WHEN OPERATING A MACHINE

(71) Applicant: HOMAG GmbH, Schopfloch (DE)

(72) Inventors: Eckhard Beilharz, Baiersbronn (DE); Patrick Müller, Glatten (DE)

(73) Assignee: HOMAG GmbH, Schopfloch (DE)

( * ) Notice: Subject to any disclaimer, the term of this patent is extended or adjusted under 35 U.S.C. 154(b) by 369 days.

(21) Appl. No.: 17/611,555

(22) PCT Filed: May 14, 2020

(86) PCT No.: PCT/EP2020/063472
§ 371 (c)(1),
(2) Date: Nov. 15, 2021

(87) PCT Pub. No.: WO2020/229604
PCT Pub. Date: Nov. 19, 2020

(65) Prior Publication Data
US 2022/0206478 A1 Jun. 30, 2022

(30) Foreign Application Priority Data
May 16, 2019 (DE) ............ 10 2019 112 869.2

(51) Int. Cl.
*G05B 19/418* (2006.01)
*B05C 5/02* (2006.01)
(Continued)

(52) U.S. Cl.
CPC ...... *G05B 19/41865* (2013.01); *B05C 5/0204* (2013.01); *B05C 11/1042* (2013.01);
(Continued)

(58) Field of Classification Search
CPC ........ G05B 19/41865; G05B 19/40937; G05B 2219/32053; G05B 2219/45013;
(Continued)

(56) References Cited

U.S. PATENT DOCUMENTS 5,771,172 A * 6/1998 Yamamoto ......... G06Q 10/0631
705/28
2005/0289022 A1* 12/2005 Iida .................. G05B 19/41865
705/29
(Continued)

FOREIGN PATENT DOCUMENTS

CN 101484295 A 7/2009
CN 103778700 A 5/2014
(Continued)

*Primary Examiner* — Yuhui R Pan
(74) *Attorney, Agent, or Firm* — Morgan, Lewis & Bockius LLP

(57) ABSTRACT

The invention relates to a method for operating a machine, in particular a coating machine, preferably a narrow-edge coating machine, such as those used e.g. in the furniture or component industry. The method comprises the following steps: transferring a plurality of input values from a storage device to a control device of the machine, the input values relating to at least one material and/or tool used in a processing of a workpiece, preparing the machine for processing based on the input values, processing a workpiece with the prepared machine, changing the input values based on the processing and/or the product, and transferring the changed input values to the storage device.

20 Claims, 1 Drawing Sheet

(51) Int. Cl.
  *B05C 11/10* (2006.01)
  *B27D 5/00* (2006.01)
  *B27N 7/00* (2006.01)
  *G05B 19/4093* (2006.01)
(52) U.S. Cl.
  CPC ............ *B27D 5/003* (2013.01); *B27N 7/005* (2013.01); *G05B 19/40937* (2013.01); *G05B 2219/32053* (2013.01); *G05B 2219/45013* (2013.01)
(58) Field of Classification Search
  CPC ............ G05B 19/41875; B05C 5/0204; B05C 11/1042; B27D 5/003; B27N 7/005; B27N 7/00; B27N 3/02; B27N 3/04
  See application file for complete search history.

(56) References Cited

U.S. PATENT DOCUMENTS

2014/0138011 A1* 5/2014 McClure .................... C09J 5/00
                                                        156/367
2020/0041986 A1* 2/2020 Homeier ................ G06Q 10/06

FOREIGN PATENT DOCUMENTS

| CN | 105666860 | A | 6/2016 | |
|----|-----------|---|--------|---|
| CN | 109476436 | A | 3/2019 | |
| DE | 202011000875 | | 3/2013 | |
| DE | 102016219371 | | 4/2018 | |
| EP | 1464470 | A2 * | 10/2004 | ............ B27D 5/006 |
| EP | 2347873 | | 7/2011 | |
| GB | 1510299 | | 5/1978 | |

\* cited by examiner

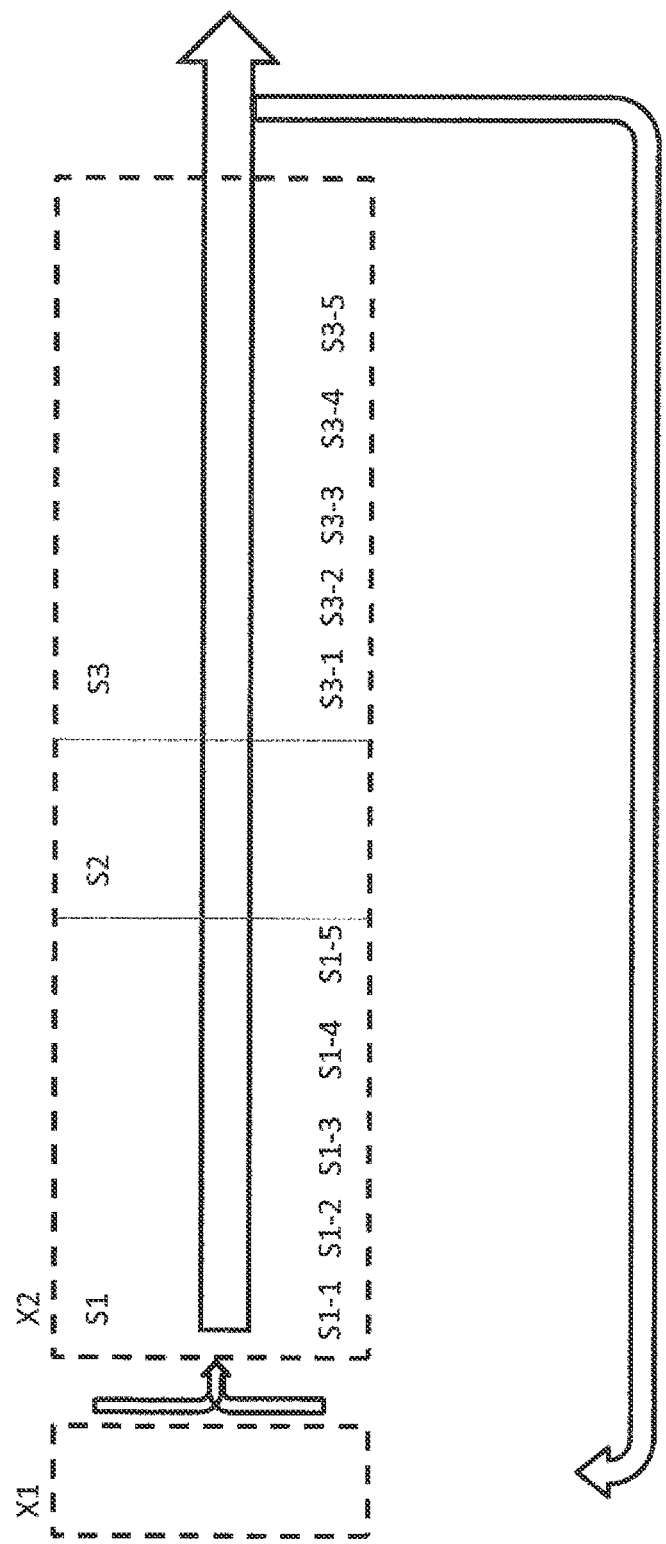

METHOD AND SYSTEM FOR ADJUSTING INPUT VALUES WHEN OPERATING A MACHINE

TECHNICAL FIELD

The invention relates to a method for operating a machine, in particular a coating machine, preferably a narrow-edge coating machine, such as those used e.g. in the furniture or component industry. The invention further relates to a system.

PRIOR ART

The manufacture of products in the furniture and component industry depends on many process variables. In particular, an initial workpiece passes through a plurality of process steps in the course of production, which in turn depend on different process variables. The item manufactured by the process steps is also referred to below as the "product".

During the manufacture of such a product, different materials and tools are used, which are either consumed due to their use during production or whose condition changes in the course of operation of the processing machine. The process variables that change against this background also depend on the material to be processed and the tools used in the course of production. Furthermore, environmental influences such as air temperature and relative humidity must be taken into account.

Approaches already exist for carrying out predictive maintenance on processing machines in order to prevent machine downtimes. Certain components of the processing machine are monitored as part of predictive maintenance. For example, error messages, availability and the capabilities of a particular machine can be stored or displayed to ensure smooth operation of the machine.

As a specific example of the manufacture of products in the furniture and component industry, it is known to apply a coating material to narrow edges of workpieces in sheet form. For feeding coating material, a concept is known from DE 10 2015 213 358 A1, which makes it possible to reduce downtimes and at the same time easily handle the coating material. In particular, DE 10 2015 213 358 A1 follows the approach of structuring the provision of coating material in such a way that the cassettes accommodating such coating material are grouped together in specific modules. This makes it possible to provide the coating material in groups and thus ensure continuous processing with great flexibility.

SUBJECT MATTER OF THE INVENTION

The invention aims at providing a method for operating a machine that allows a high level of quality to be achieved with a flexible manufacturing operation.

Claim 1 provides a corresponding method. Other preferred embodiments are presented in the dependent claims. The invention further relates to a system that is in particular adapted to carry out such a method.

The method comprises the following steps: transferring a plurality of input values from a storage device to a control device of the machine, the input values relating to at least one material and/or tool used in a processing of a workpiece, preparing the machine for processing based on the input values, processing a workpiece with the prepared machine, changing the input values based on the processing and/or the product, and transferring the changed input values to the storage device. For example, information can be recorded with a sensor and, based on this or an input from an operator, an input value can be changed. This changed value can then be transferred to the storage device, for example.

The method according to the invention has the advantage that an increased understanding of the process can be pooled to a certain extent, and measures for ensuring and possibly increasing quality and/or efficiency can be derived therefrom. In particular, it is possible to adapt input values for the operation of a machine so that a high level of quality is achieved in the processing of workpieces. Furthermore, the method according to the invention results in optimised use of material and energy in such a processing machine. Machine downtimes can be reduced or prevented.

The input values transferred to the machine can be compared with corresponding machine parameters to ensure safe operation of the machine.

Where the input value relates to an adhesive used in a processing of a workpiece, certain temperature ranges are specified by the adhesive manufacturer within which the adhesive is to be processed. As part of the method, it is ensured that the input value relating to a specific processing temperature lies within the temperature range specified by the manufacturer.

Other examples of parameters include the feed speed range of a machine, position accuracy, a range of dimensions of workpieces to be processed, or a contact pressure range.

In this context, it has proved advantageous for the storage device to be a globally available storage device, in particular a cloud, the machine preferably having an internet-enabled interface. This facilitates the possibilities regarding the transfer of input values from the storage device to the control device.

After the preparation step and before the processing step, it is preferred to carry out a material testing step. Material availability can be checked as part of this step. This makes it possible to avoid downtimes and ensure a continuous process.

Material consumption, in particular the consumption of a coating material or an adhesive, can be calculated during the material testing step. This also makes it possible to avoid downtimes and ensure a continuous process.

The machine is preferably a coating machine, preferably a narrow-edge coating machine. Such a coating machine is used, for example, to apply a coating material to workpieces in sheet form made of wood or wood-based materials. Such a machine can be used in the woodworking industry.

The step of preparing the machine for processing based on input values may include one or more of the following steps: adjusting a processing temperature of an adhesive, selecting a coating material, adjusting the machine based on the workpiece to be processed, adjusting and/or positioning one or more processing devices. The input values and machine parameters can be included in the preparation step.

Processing a workpiece with the prepared machine may comprise one or more of the following steps: heating a coating material and/or workpiece, applying an adhesive to the workpiece and/or coating material, detecting a fed coating material, pressing a coating material onto a workpiece.

A quality check is preferably carried out on the product, in particular by means of sensors of the machine, before the input values are changed. This makes it possible to check a specific processing result and change one or more input values based on this information.

After the workpiece has been processed, an actual material consumption value, in particular of the consumption of an adhesive and/or a coating material, can be transferred to the the storage device. If necessary, a measure can be initiated on this basis, for example, the material in question can be re-ordered.

A computer program, executed by a computer, is also provided. The computer program comprises control commands which, when the computer program is executed, cause the computer to carry out the method according to any of the preceding claims.

The invention further relates to a system for operating a machine. The system comprises: a storage device and a control device, a device for transferring a plurality of input values from a storage device to a control device of the machine, the input values relating to at least one material and/or tool used in a processing of a workpiece, wherein the control device is adapted to: (a) prepare the machine for processing based on the input values, (b) output control commands for processing a workpiece with the prepared machine, and (c) change input values based on the processing and/or the product and transfer them to the storage device.

The storage device can be a globally available storage device, in particular a cloud. The machine can have an internet-enabled interface. This facilitates the possibilities regarding the transfer of input values from the storage device to the control device.

Furthermore, a testing device may be provided to check the material. For example, material availability can be checked by means of the testing device in order to avoid downtimes and ensure a continuous process.

A further embodiment provides that the machine is a coating machine, preferably a narrow-edge coating machine. Such a coating machine is used, for example, to apply a coating material to workpieces in sheet form made of wood or wood-based materials. Such a machine can be used in the woodworking industry.

Furthermore, the system may include sensors to check the quality of the product produced by the machine. This makes it possible to check a specific processing result and change one or more input values based on this information.

The control device may be adapted to perform one or more of the following steps: adjusting a processing temperature of an adhesive, selecting a coating material, adjusting the machine based on the workpiece to be processed, adjusting and/or positioning one or more processing devices. The input values and machine parameters can be included in the preparation step.

A processing of a workpiece may further comprise one or more of the following steps initiated by the control device: heating a coating material and/or workpiece, applying an adhesive to the workpiece and/or coating material, detecting a fed coating material, pressing a coating material onto a workpiece.

BRIEF DESCRIPTION OF THE FIGURE

FIG. 1 schematically illustrates a process of an embodiment of the method according to the invention.

DETAILED DESCRIPTION OF THE PREFERRED EMBODIMENT

The schematic FIGURE illustrates a process sequence in order to elucidate a method for operating a machine, in particular a processing machine for coating a narrow edge of a workpiece in sheet form. Modifications of certain steps of the method may be individually combined with one another to form further embodiments. Although the following description is not to be understood as restrictive but rather as exemplary, individual features, in particular individual process steps or modifications thereof, can also be used to specify the invention.

The method is described by means of an embodiment in which a coating material is applied to a narrow edge of a workpiece in sheet form. It is evident that other processes for working or processing a workpiece can also be carried out with the described method, for example coating a broad side of a workpiece, joining two or more workpieces, printing a surface of a workpiece or the like.

Such a workpiece in sheet form may comprise wood or a wood-based material. For example, it may be a solid wood board, chipboard, MDF board, HDF board or the like. The coating material in strip form to be applied to the narrow edge is, for example, a veneer or a plastic coating material.

To carry out the method, a storage device X1 is provided, which can be a globally available storage device, such as a cloud, or a storage unit available locally at a manufacturer.

The storage device X1 stores design data and/or manufacturing data describing the product and/or defining its manufacture. Furthermore, material-specific data, preferably provided by the manufacturer, as well as machine data of the machine are stored in the storage device X1. In particular, workpiece dimensions, data concerning the workpiece material, data concerning the coating material, etc. relating to the initial workpiece are stored in the storage device X1.

Material-specific data of workpieces and of materials to be processed that are stored in the storage device X1 can, for example, be stored in the storage device X1 by the manufacturer or supplier of a specific workpiece or a specific material. Also, a data record of the materials to be processed can be created by the user of the processing machine and stored in the storage device X1.

Furthermore, machine data are stored that include the so-called machine capability (processing capabilities of a specific processing machine) and wear values of certain components, such as actuators.

From this information available in the storage device X1, in order to carry out a processing operation, a control device X2 of a processing machine retrieves the data needed to prepare the machine for production (step S1). Preparation of the machine can comprise one or more sub-steps.

According to the embodiment example, the machine is a coating machine for applying a coating material to a narrow edge of a workpiece. Such a machine may have a roller application system for processing hot melt adhesives. In particular, such a roller application system applies a heated, viscous adhesive to a workpiece. Furthermore, a pressure device, in particular a pressure roller, is provided, with which a coating material in strip form is pressed onto a narrow edge of a workpiece provided with adhesive.

According to another embodiment, the coating machine is adapted to apply a coating material already provided with an adhesive or adhesion creating means, so that the roller application system can be omitted.

In the embodiment example, in the course of which a coating material is to be applied to a narrow edge of a workpiece, this concerns data relating to the adhesive, the coating material, the workpiece, and to the compensation for specific processing tools and/or environmental influences. Based on the information supplied to the control device X2, the processing machine can be prepared for a manufacturing operation in a first step by retrieving a setting for a specific type of adhesive and deriving the processing temperature from this. This means that the glue container is preheated to a certain temperature (step S1-1), taking the specific type of adhesive into account.

Furthermore, the processing machine is set up for a specific coating material, including the thickness of the coating material and the height of the coating material, in order to make adjustments in the area of the pressure zone (step S1-2). Set-up of the coating material can be realised as follows:

Based on the workpiece information, in particular the material type and/or composition, the machine can be set up for the specific workpiece to be processed, with the degree of porosity, the density, the workpiece temperature and the workpiece thickness being derived from the indication of the workpiece material (e.g. HDF, MDF, etc.), the type of workpiece (solid, chipboard, etc.) and the workpiece thickness (step S1-3).

Furthermore, known wear values are compensated (step S1-4) by, for example, selecting an exact position of a particular actuator while taking wear into account or, if the wear value of a particular actuator exceeds a maximum wear value, requesting maintenance (step S1-4).

Also, environmental influences, such as ambient temperature, can be compensated for in order to select the position, taking into account the thermal expansion coefficient of an actuator and/or compensation for a change in length (step S1-5).

After the processing machine has been prepared for a processing operation using one or more of steps S1-1 to S1-5, the material availability is checked and a consumption of the material to be processed required for a specific production order is calculated.

To prepare a processing operation, a material feed for a specific coating material is also preselected on the basis of the above-mentioned test steps (step S2).

The processing machine is now in an operational state and production can be started. A production process (step S3) usually comprises several sub-steps.

At the start of production, the feed is started, and a specific heating temperature is set on the basis of predefined processing temperatures to heat the coating material and/or the workpiece (step S3-1).

Furthermore, a workpiece to be processed and entering the processing area is detected, with, in particular, the condition of the surfaces of the narrow edge to be coated, surface irregularities and/or possible deviations from a plane surface of the narrow edge being determined. In particular, a photo-optical sensor is used for this purpose, which determines the porosity of the surface to be coated and, if applicable, the volume of the open pores.

Based on this information, the application of adhesive is, if necessary, adjusted and subsequently initiated (step S3-2), so that an application of adhesive is matched to the type and condition of the detected surface. Furthermore, a specific contact pressure of a pressure roller for pressing the coating material onto the narrow edge of the workpiece can be set.

In a further sub-step of the manufacturing process, the coating material to be applied to the workpiece is detected (S3-3), with in particular the actual thickness of the coating material being determined. Taking these data into account, edge thickness compensation can be realised in the processing machine.

Edge thickness compensation can be achieved by adjusting the pressure roller and other downstream processing tools. For example, a profile cutter for processing the workpiece provided with the coating material is adjusted based on the determined thickness of the coating material.

As a further step during production, the coating material is now applied to a narrow edge of a workpiece in sheet form. For this purpose, the temperature and position of the coating material during feeding and also, where appropriate, the degree of contamination of a glue application roller are determined, so that the energy input and the edge position can be adjusted (step S3-4).

After the coating material has been applied to the workpiece, quality monitoring takes place within the processing machine or in a downstream station. This includes in particular an evaluation of the joint quality, which indicates whether the adhesive joint is visible between the coating material and the workpiece in the edge area of the coating material. From the quality monitoring it is possible to determine whether or not the processing meets a defined quality standard (step S3-5).

As part of quality monitoring, the quality of the adhesive joint is tested in particular. The adhesive joint is to be minimally visible to the viewer of the product. This requires a continuous and even application of adhesive on the narrow edge of the workpiece.

Thus, from the individual steps in the production of a workpiece, in particular the preparation of the machine, the testing of the coating material to be applied and the actual production process, a large amount of information is recorded, and measures for adjusting the machine are derived from it. The measures are defined by certain input values, leading to adjustments on a specific processing machine.

These input values are documented and transferred to the storage device X1 as one or more data records. If the storage device X1 is a globally available control device, information from different processing machines of different users can be combined and stored.

The storage device X1 is therefore able to modify the stored input values on the basis of the data records fed back and adapt them to certain parameters. It is also possible to further refine parameters through machine learning and thus provide an improved database.

The invention claimed is:

1. A method for operating a narrow-edge coating machine, comprising the following steps:
   transferring a plurality of input values from a storage device to a control device of the machine, the input values relating to at least one material and/or tool used in a processing of a workpiece,
   preparing the machine for processing based on the input values,
   processing a workpiece with the prepared machine by applying a coating to a narrow edge of the workpiece to form a product with an adhesive joint,
   changing the input values based on the processing and/or the product and transferring the changed input values to the storage device,
   wherein a control command to order a material and/or a tool is generated based on an actual material consumption value;
   wherein after the coating is applied to the narrow edge of the workpiece, a quality check is carried out based on the visibility of the adhesive joint of the product by sensors of the machine; and
   wherein the input values are changed based on the quality check.

2. Method according to claim 1, wherein the storage device is a cloud, the machine having an internet-enabled interface.

3. Method according to claim 1, wherein, after the step of transferring the plurality of input values, a comparison is made with at least one machine parameter.

4. Method according to claim 1, wherein a material testing step is carried out after the preparation step and before the processing step.

5. Method according to claim 4, wherein the material consumption value is calculated during the material testing step.

6. Method according to claim 1, wherein preparation comprises one or more steps selected from: adjusting a processing temperature of an adhesive, selecting a coating material, adjusting the machine based on the workpiece to be processed, adjusting and/or positioning one or more processing devices.

7. Method according to claim 1, wherein the processing of a workpiece comprises one or more steps selected from: heating a coating material and/or workpiece, applying an adhesive to the workpiece and/or coating material, detecting a fed coating material, pressing a coating material onto a workpiece.

8. Method according to claim 1, wherein a quality check is carried out on the product by sensors of the machine, before the input values are changed.

9. Method according to claim 1, wherein, after the workpiece has been processed, the actual material consumption value is transferred to the storage device.

10. System for operating a narrow-edge coating machine, comprising:
   a storage device and a control device,
   a device for transferring a plurality of input values from a storage device to a control device of the machine, the input values relating to at least one material and/or tool used in a processing of a workpiece,
   wherein the control device is adapted to:
      prepare the machine for processing based on the input values, wherein the processing involves applying a coating to a narrow edge of the workpiece to form a product with an adhesive joint,
      output control commands for processing a workpiece with the prepared machine,
      change input values based on the processing and/or the product and transfer them to the storage device,
      transmit a control command to order a material and/or a tool based on an actual material consumption value, and
      after the coating is applied to the narrow edge of the workpiece, perform a quality check based on the visibility of the adhesive joint of the product using sensors of the machine and change the input values based on the quality check.

11. System according to claim 10, wherein the storage device is a cloud, the machine having an internet-enabled interface.

12. System according to claim 10, further comprising a testing device for checking the material.

13. Method according to claim 5, wherein the material consumption value refers to the consumption of a coating material or of an adhesive.

14. Method according to claim 9, wherein the actual material consumption value refers to the consumption of an adhesive and/or a coating material.

15. Method according to claim 1, wherein during the quality check, an adhesive joint of the product is tested.

16. Method according to claim 1, wherein in the quality check, an adhesive joint of the product is tested.

17. System according to claim 10, wherein during the quality check, an adhesive joint of the product is tested.

18. System according to claim 10, wherein in the quality check, an adhesive joint of the product is tested.

19. Method according to claim 1, wherein the processing comprises applying a coating material in sheet form to the narrow edge of the workpiece.

20. System according to claim 10, wherein the control device is adapted to prepare the machine for processing based on the input values, wherein the processing involves applying a coating material in sheet form to a narrow edge of the workpiece.

* * * * *